United States Patent [19]
Dichter

[11] Patent Number: 5,695,539
[45] Date of Patent: Dec. 9, 1997

[54] DEVICE FOR THE SHAPING OF GLASS TUBES

[76] Inventor: Hans-Joachim Dichter, Tempelhofer Weg 65-68, D-10829 Berlin, Germany

[21] Appl. No.: 663,265
[22] PCT Filed: Jan. 5, 1995
[86] PCT No.: PCT/DE95/00030
  § 371 Date: Jun. 19, 1996
  § 102(e) Date: Jun. 19, 1996
[87] PCT Pub. No.: WO95/18770
  PCT Pub. Date: Jul. 13, 1995

[30] Foreign Application Priority Data
  Jan. 5, 1994 [DE] Germany .................. 44 00 407.9
[51] Int. Cl.[6] .................................................. C03B 23/04
[52] U.S. Cl. ............................ 65/292; 65/276; 65/297
[58] Field of Search ........................ 65/276, 278, 279, 65/280, 292, 297

[56] References Cited

U.S. PATENT DOCUMENTS 3,171,730  3/1965  Zauner ............................ 65/109

FOREIGN PATENT DOCUMENTS 1224451   9/1966   Germany .
495920   10/1970   Switzerland .
8706223  10/1987   WIPO .

Primary Examiner—Donald E. Czaja
Assistant Examiner—Sean Vincent
Attorney, Agent, or Firm—Mark P. Stone

[57] ABSTRACT

In order to shape the necks of glass tubes (1) on glass processing machines, use is made of a device with two shaping tools, one of which takes the form of a ring (3) surrounding the glass tube (1) and the other shaping tool consisting of a roller (2).

9 Claims, 1 Drawing Sheet

DEVICE FOR THE SHAPING OF GLASS TUBES

The invention relates to a device for the shaping of glass tubes, with two shaping tools which can be set in rotational movement and which can be pressed in opposite directions against the circumference of the softened glass tube, in order to produce a contraction of the glass tube, said contraction corresponding to their profile.

In glass processing machines for producing small bottles from glass tubes, devices of the above type are used for shaping the necks of the bottles. In a relevant device known from DE 17 96 100 B2, shaping rollers arranged in pairs are held by jib arms which are movable to and fro in opposite directions and which, during the shaping process, are moved towards the longitudinal axis of the glass tube in such a way that the latter is gripped in a pincer-like manner by the shaping rollers. During shaping, essentially linear contact occurs between the shaping rollers and the glass tube softened by the effect of heat. As experience has shown, irregularities in a glass tube, particularly fluctuations in its wall thickness, may result in the actual shape of the bottle neck deviating from the desired shape to a greater extent than is permissible.

The object on which the invention is based is to afford a possibility for improving the shaping accuracy of relevant devices. The set object is achieved, according to the invention, in that, in a device of this type, one of the two shaping tools is designed as a ring which surrounds the glass tube and the other shaping tool formed by a roller.

The device according to the invention offers the advantage that it reacts to deviations in the desired dimensions of glass tubes less sensitively than known devices. The reasons for the improved mode of operation would seem to be the contact region between the outer shaping tool designed as a ring and the softened glass tube, said contact region being enlarged in relation to linear contact, and the reduction in angle in the region of the wedge-shaped gap between the inner face of the outer shaping tools and the outer face of the glass tube.

BRIEF DESCRIPTION OF THE DRAWINGS

Further details and features of the invention emerge from the subclaims and from the following description of the accompanying drawing. In this:

Figure 1:
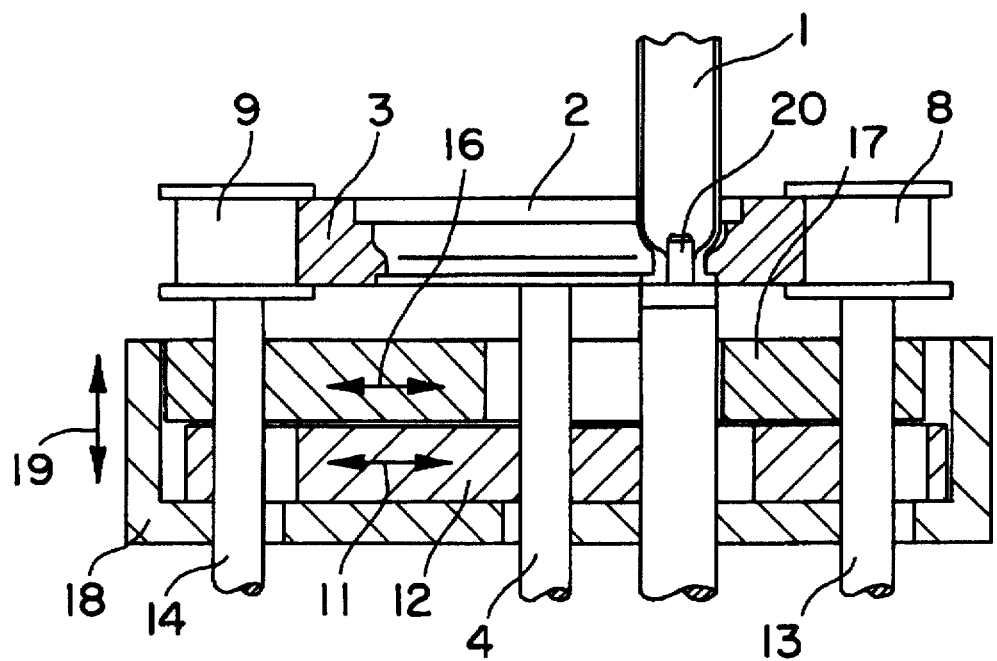
FIG. 1 shows a diagrammatic side view of a device, partially in section.
Figure 2:
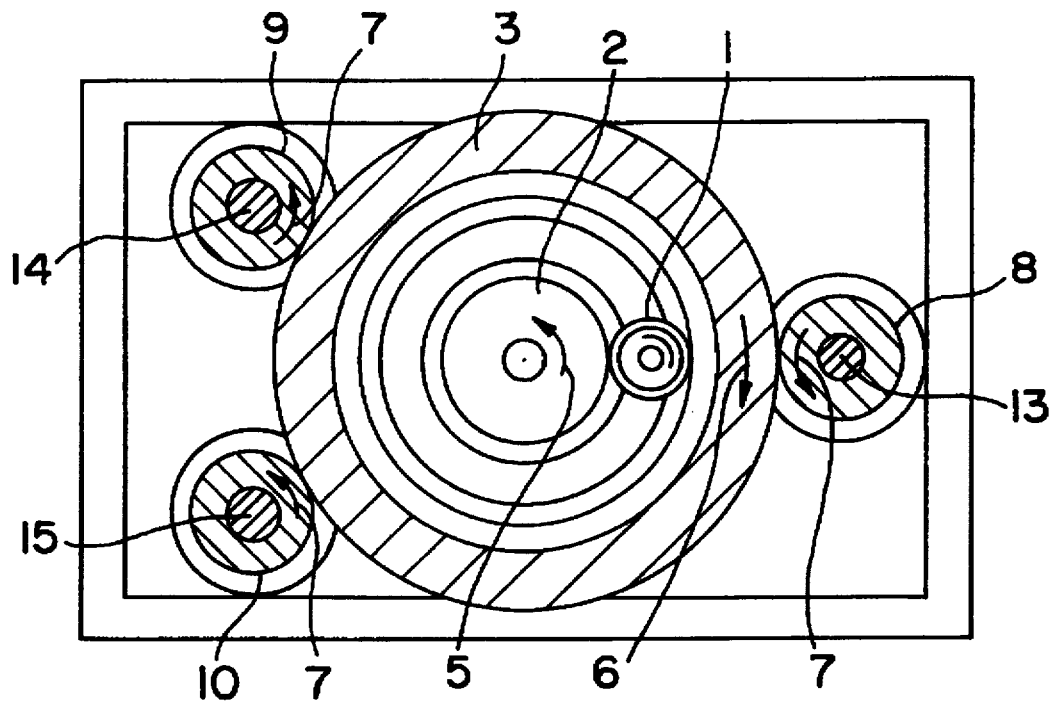
FIG. 2 shows a top view of the device according to FIG. 1, likewise partially in section.

In the figures, 1 denotes a glass tube, from which small glass bottles are produced on a known glass processing machine. The figures show the position of the shaping tools, used for producing the neck of the glass tube 1, at the end of the shaping operation. The shaping tools are formed by a roller 2 and a ring 3 surrounding the roller 2. A rotational movement illustrated by reference numeral 5 is imparted to the roller 2 by an electric motor (not shown) via a shaft 4, whilst three drive rollers 8, 9 and 10 rotating in the same direction in the direction of the arrows 7 serve for driving the ring 3 in the direction of the arrow 6, said drive rollers holding the ring 3 and being driven jointly by a further electric motor (not shown), the rotational speed of the motors used for driving the roller 2 and the ring 3 being controlled in such a way that a rolling movement occurs between the shaping tools and the glass tube 1.

The shaft 4 of the roller 2 is mounted in a slide 12 movable to and fro in the direction of the double arrow 11, whilst the shafts 13, 14 and 15 of the drive rollers 8, 9, 10 and of the ring 3 held by these are each mounted in a slide 17 so as to move in the direction of the double arrow 16 in opposition to the movements of the slide 12. The two slides 12 and 17 can additionally be moved up and down in the direction of the double arrow 19 by means of a lifting slide 18. The slides 12, 17 and 18 are driven by means known per se, the illustration and description of which can consequently be dispensed with.

During the shaping operation, a mandrel 20 penetrates into the lower open end of the glass tube 1, as is likewise generally conventional and known.

I claim:

1. A device for the shaping of glass tubes, with two shaping tools which can be set in rotational movement and which can be pressed in opposite directions against the circumference of a softened glass tube, in order to produce a contraction of the glass tube, said contraction corresponding to their profile, wherein one of the two shaping tools is designed as a ring which surrounds the glass tube and the other shaping tool formed by a roller.

2. The device as claimed in claim 1, wherein the shaping tool formed by a ring is held by at least three drive rollers distributed over the ring circumference.

3. The device as claimed in claim 1, wherein shafts of drive rollers for the shaping tool designed as a ring are mounted in a slide which can execute to-and-fro movements directed perpendicularly to the longitudinal axis of the glass tube.

4. The device as claimed in claim 1, wherein a shaft of the shaping tool designed as a roller is mounted in a slide which can execute to-and-fro movements directed perpendicularly to the longitudinal axis of the glass tube.

5. The device as claimed in claim 3, further comprising at least a pair of slides, said pair of slides being movable in opposite directions.

6. The device as claimed in claim 1, wherein the shaping tools can be moved up and down by means of a lifting slide.

7. The device as claimed in claim 1, wherein a mandrel can be introduced into the orifice of the glass tube.

8. The device as claimed in claim 2, wherein shafts of the drive rollers for the shaping tool designed as a ring are mounted in a slide which can execute to-and-fro movements directed perpendicularly to the longitudinal axis of the glass tube.

9. The device as claimed in claim 4, further comprising at least a pair of slides, said pair of slides being movable in opposite directions.

* * * * *